May 6, 1969 T. SIMPSON 3,442,146
INTERMITTENT ROTARY MOTION
Filed July 7, 1967 Sheet 1 of 3

THEODORE SIMPSON
INVENTOR.

BY
ATTORNEY.

May 6, 1969
T. SIMPSON
3,442,146
INTERMITTENT ROTARY MOTION
Filed July 7, 1967
Sheet 2 of 3
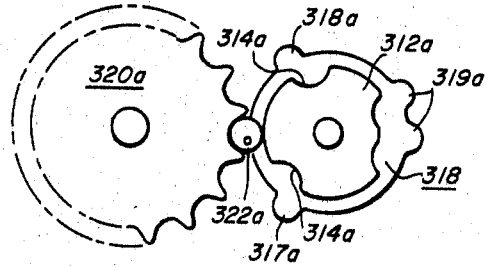
FIG. 3A.
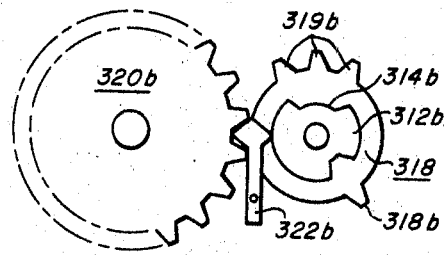
FIG. 3B.
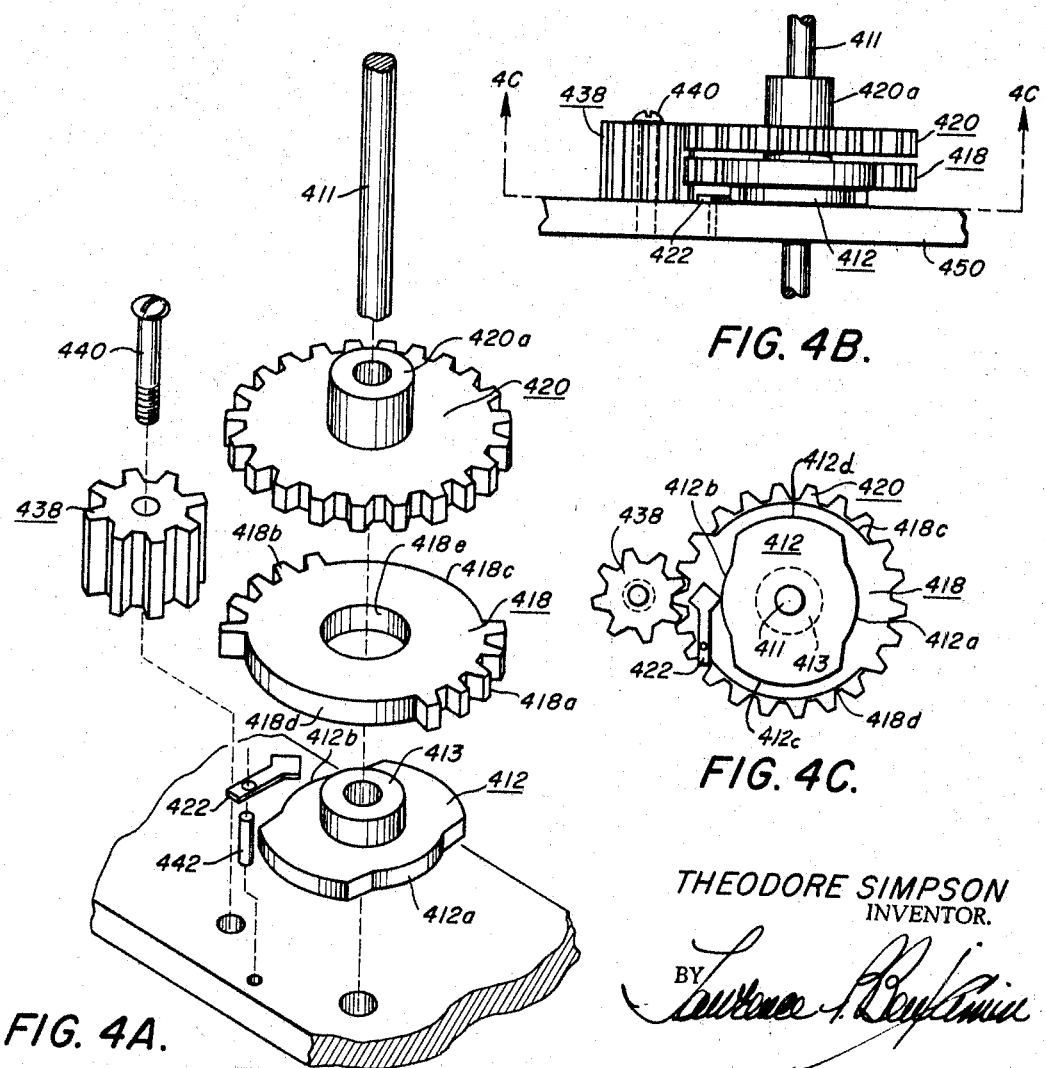
FIG. 4A.
FIG. 4B.
FIG. 4C.
THEODORE SIMPSON
INVENTOR.
BY
ATTORNEY.

THEODORE SIMPSON
INVENTOR.

BY *Lawrence [signature]*

ATTORNEY.

United States Patent Office 3,442,146
Patented May 6, 1969

3,442,146
INTERMITTENT ROTARY MOTION
Theodore Simpson, 55 Ash St.,
Nashua, N.H. 03060
Filed July 7, 1967, Ser. No. 651,951
Int. Cl. F16h 27/04
U.S. Cl. 74—84                    5 Claims

ABSTRACT OF THE DISCLOSURE

An intermittent, rotary motion mechanism wherein a drive wheel having a drive pin and a cam cutout, drives a driven wheel which may be either a gear or a sprocket. A locking device in contact with both the drive wheel and the driven wheel unlocks the driven wheel during those periods the driven wheel is rotating and maintains the driven wheel in a locked condition during those times the driven wheel is not rotating.

Background of the invention

This invention relates to intermittent rotary motion mechanisms and in particular to intermittent rotary motion mechanisms in which a drive wheel indexes a driven wheel, one or more times per revolution of the driven wheel. Yet, when not in motion, the driven wheel is firmly locked in position.

There are many arts which require a simple and inexpensive assembly that will produce an indexing or intermittent motion mechanism for a periodic driving or rotation of a shaft. The need for this device may be found in adding or counting machines, odometers, cameras, projectors, television tuners, etc. In all of these instances, in addition to simplicity and low cost there is also a need for a miniaturized device capable of providing small indexing angles of driven wheel per revolution of drive wheel.

The prior art Geneva mechanism is usually unsatisfactory because any motion of the driven wheel less than 90° per index has been found difficult to obtain with small diameter wheels and as such does not lend itself to miniaturization. In addition, the nature of the prior art Geneva mechanism is such that complex machine operations are necessary to construct the required motions and hence, the manufacturing cost thereof is relatively high.

Summary of the invention

In my device a drive wheel having drive means and a cam cutout located along the periphery thereof are made to mate by a driven wheel. A locking device is provided which contacts both the drive wheel and the driven wheel in such a manner as to allow the drive wheel to rotate freely until the indexing operation is to take place, at which time, the locking means unlocks the driven wheel for that period of time that the indexing takes place. Thereafter, and until the next indexing period, the driven wheel is always firmly locked to prevent any inadvertent or unwanted indexing.

Practically speaking, my device is eminently suited, for example, to a TV tuner arrangement for changing channels. The tuner may be switched from channel to channel, and when it is desired to "fine tune" the tuner, this may also be done without the need to resort to an additional shaft.

It is, therefore, a principal object of the present invention to provide a novel device capable of providing an intermittent motion.

Another principal object of the present invention is to provide a novel indexing or detent mechanism having no backlash yet which is precisely repositionable.

Still another principal object of the present invention is to provide a novel indexing or detent mechanism in which the driven element is firmly fixed at all times except during the indexing period.

A further principal object of the present invention is to provide a novel indexing or detent mechanism that may be easily engaged or disengaged.

The features of my invention which I believe to be novel are set forth with particularity in the appended claims. My invention itself, however, both as to its organization and method of operation, together with further objects and advantages thereof, may be best understood by reference to the following description taken in conjunction with the accompanying drawings.

Description of the drawings

FIGURE 3A is another variation of the embodiment of FIGURE 1A utilizing a different locking means;

FIGURE 3B is still another variation of the embodiment of FIGURES 1A and 1B utilizing spur gears and a spur head locking means;

FIGURE 4A is an exploded view of another variation of FIGURES 1A and 1B in which the input and output wheels are on a single shaft;

FIGURE 4B is an elevation view of the embodiment of FIGURE 4A;

FIGURE 4C is a plan view of the embodiment of FIGURE 4A taken along lines 4C—4C of FIGURE 4B;

Disclosure of the preferred embodiments

Figure 1A:
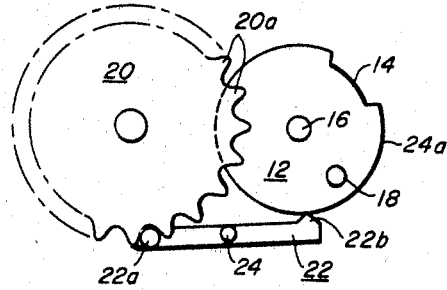
FIGURE 1A is a plan view of one embodiment of my intermittent rotary motion mechanism in the locked position.
Figure 1B:
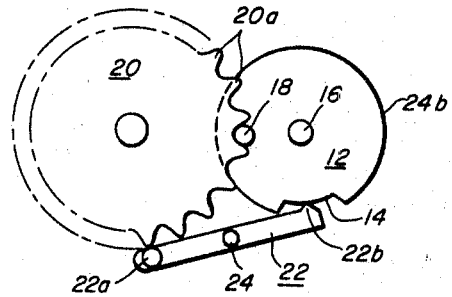
FIGURE 1B is a plan view of the embodiment of FIGURE 1A in its unlocked position.

Referring now to FIGURES 1A and 1B, there is shown an indexing mechanism wherein a cam drive 12 having an unlocking cam cutout portion 14 on the cam surface periphery 24a and driven by input shaft 16. Drive pin 18, located near the perimeter of cam 12, engages teeth 20a of output sprocket 20. Pallet 22 rotates about pivot pin 24 and has a cam follower 22b and a locking pin 22a. The operation consists of rotating cam drive 12 in either a clockwise or counterclockwise direction with the cam follower 22b of pallet 22 following the cam surface or periphery 24a of cam drive 12. When in this position, locking pin 22a of the pallet 22 engages the teeth of sprocket 20 so that cam drive 12 may rotate through all the high portions of the cam surface while maintaining sprocket 20 in a locked position.

As drive pin 18 enters teeth 20a of sprocket 20, the cam cutout portion 14 approaches the cam follower 22b of pallet 22. At the instant that cam follower 22b of pallet 22 enters cam cutout portion 14, drive pin 18 engages tooth 20a causing the locking pin 22a to disengage the spocket 20 as shown in FIGURE 1B. Sprocket 20 is then rotated a given amount while cam follower 22b is in the cam cutout 14 of drive cam 12. At the instant that drive pin 18 disengages the sprocket 20, cam 12 moves the cam follower 22b out of cam cutout 14 causing pallet 22 to rotate on pivot pin 24 and reengage locking pin 22a into sprocket 20. Thus, output sprocket 20 is held and locked in a fixed position until drive pin 18 reengages sprocket 20 to repeat the operating cycle.

Figure 1C:
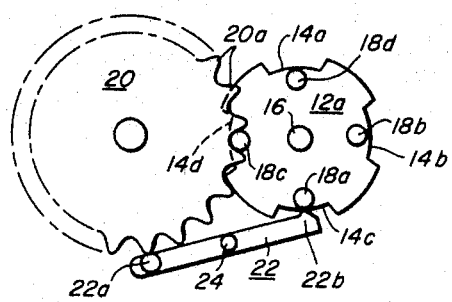
FIGURE 1C is a plan view of a multi-position mechanism in the unlocked position of the embodiment of FIGURE 1A.

Referring now to FIGURE 1C, there is shown a variation of FIGURES 1A and 1B wherein a given 360° rotation of cam drive 12 will produce a number of intermittent motions of output sprocket 20. The intermittent motions may be equally spaced, as illustrated, by varying the positions of the drive pins 18a–18d and correspondingly varying the positions of cam cutout portions 14a–14d. In this variation, similar parts are similarly numbered where they perform similar functions and the operation is similar to that previously described for FIGURES 1A and 1B.

Figure 2B:
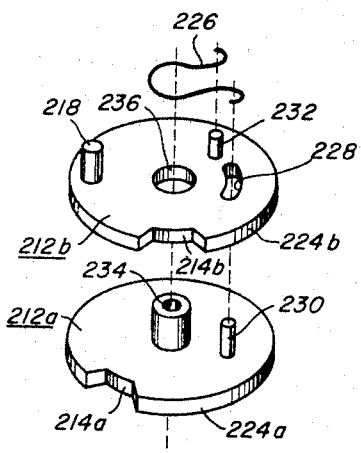
FIGURE 2B is an exploded view of the drive portion of the embodiment of FIGURE 2A.
Figure 2A:
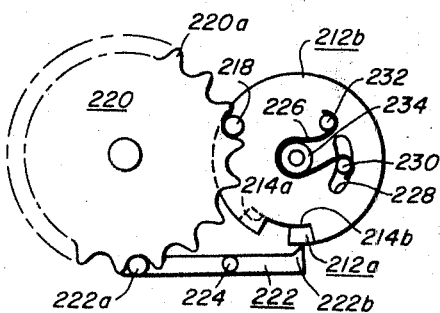
FIGURE 2A is a plan view of a snap action variation of the embodiment of FIGURE 1A in the locked position.

Referring now to FIGURES 2A and 2B, there is shown a snap-action variation of the embodiment of FIGURE 1A. In this variation, it is desired that the sprocket be rotated to its next indexed position very quickly and to perform this function, and there is shown an input drive cam 212a and a secondary drive cam 212b. Each cam is provided with cam cutout portion 214a and 214b respectively. In addition, secondary drive cam 212b is provided with a drive pin 218, a radial slot 228, a spring retaining pin 232 and an aperture 236 which mates with shoulder 234 on input drive cam 212a. The input drive cam is further provided with a retainer pin 230. When the two cams are mated, spring 226 is wrapped around shoulder 234. One end of spring 226 is retained by pin 232 on cam 212b and the other end is retained by pin 230 that extends thru slot 228 above the surface of cam 212b. Thus, the applicant is able to show a device which will provide a snap action motion in a given direction. In this particular illustration, output motion will be provided only when input drive cam 212a is rotated in a counter-clockwise direction. To impart the snap action function to sprocket 220, a drive shaft (not shown) rotates input drive cam 212a with secondary drive cam 212b following due to the torque applied by spring 226 between pins 230 and 232. When driving pin 218 engages sprocket 220 cam 212b will be aligned as shown in FIGURE 2A. The cam cutout portion 214b will be immediately adjacent to the cam follower 222b of pallet 222. However, cam follower 222b will be riding on the high portion 224a of input drive cam 212a. In this condition the sprocket 220 remains in the locked position thus holding drive pin 218 and secondary drive cam 212b in a stationary position as input drive cam 212a continues to rotate. As input cam 212a continues to rotate, pin 230 rotates in slot 228 of cam 212b causing spring 226 to be torqued or wound. At the instant that cam cutout 214a clears cam follower 222b the energy stored in spring 226 is released causing secondary drive cam 212b and drive pin 218 to rotate sprocket 220 to the next indexed position. As the sprocket 220 rotates, locking pin 222a disengages the sprocket 220 as the cam follower enters cam cutout portions 214a and 214b. At the instant that drive pin 218 disengages sprocket 220, the secondary drive cam 212b moves the cam follower 222b out of cam cutout portion 214b causing pallet 222 to pivot on pin 224 and locking pin 222a reengages sprocket 20. Thus, locking and holding the output sprocket 220 in a fixed position until drive pin 218 reengages sprocket 220 and repeats the operating cycle. Although the snap action variation of FIGURES 2A and 2B is illustrated as having only one output motion per 360° revolution of the input shaft, by the utilization of additional drive pins and corresponding cam cutouts, a number of output motions per 360° revolution of the input shaft can be obtained as previously illustrated in FIGURE 1C.

While I have described in the two previous embodiments a driven element consisting of a sprocket, it should be obvious to those skilled in the art that a spur gear may be appropriately substituted for the sprocket, while segment gears may be substituted for the driving element to achieve the same results. Similarly, while the locking mechanism has been described in terms of a rocker pallet, it will also be obvious to those skilled in the art that a disc pallet may be substituted therein with the same result. Also rollers can be used at both ends of a rocker pallet as either the locking pin or as the cam follower. Similarly spur gear models may use either the rocker pallet or a spur head pallet.

Referring now to FIGURE 3A there is shown a sprocket type driven device in conjunction with a disc pallet 322a. In this embodiment the input motion is applied by drive sprocket 318 having sprocket teeth 317a, 318a and 319a located at various positions as shown. Concentric with and affixed to or a part of the drive sprocket 318 is a locking cam 314 having cam cutout portions 314a located around the periphery thereof. Thus when sprocket tooth 318a engages the teeth of sprocket 320a, the appropriate cam cutout portion 314a will be located immediately adjacent disc pallet 322a allowing the sprocket tooth of 320a to move disk pallet 322a into cam cutout portion 314a. For the duration of the rotation provided by sprocket tooth 318a, pallet 322 will remain in cam cutout portion 314a to be driven back into engagement with the teeth of output sprocket 320a when sprocket 318 is rotated further. Thus the output sprocket will remain locked and fixed until acted upon by driving teeth 317a and 319a as previously described.

Referring now to FIGURE 3B there is shown a spurgear variation utilizing a spur head pallet 322b. As in the embodiment of FIGURE 3A, a driving spur-gear 318 and cam 312b is utilized together with cam 312b having cam cutout portions 314b located with respect to driving teeth 318b and 319b. Thus, as teeth 319b engage the teeth on the driven gear 320b, pallet 322b is moved into the cam cutout portion 314b allowing teeth 319b to rotate gear 320b. As soon as the motion is fully imparted to the driven gear 320b, pallet 322b is moved up onto the peripheral surface of locking and holding gear 320b until it is acted upon by the next driving tooth.

In the previous illustrations of FIGURES 3A and 3B it will now be obvious that the output motions can be varied by the number of drive teeth applied to each output motion and the positioning of the drive teeth with corresponding locking cam cutout portions.

Referring now to FIGURES 4A, B and C, there is shown a single shaft embodiment which will operate in either a clockwise or counterclockwise direction and having the input and output gears located on a common shaft. Locking cam 412 has the same cam cutout portions 412a and 412b located on the periphery thereof, as previously described with respect to FIGURE 3B and is further provided with a shoulder 413 (see FIGURE 4A) for mating with aperture 418e of driving gear 418. This serves to align and fix locking cam 412 and driving gear 418 so that the cam cutout portions 412a and 412b are properly located and aligned with respect to driving teeth 418a and 418b of driving gear 418. Idler gear 438 is located adjacent and in mesh with the teeth in both the driven gear 418 and the output gear 420 and is rotatably affixed to base 450 by bolt means 440. Pallet 422 has the pivot end fixed to base 450 by means of pin 442 so that its other end is free to engage either locking cam 412 or idler gear 438 or both. Teeth 418a and 418b of driving gear 418 are positioned for either a number of intermittent motions or a number of degrees of rotational motion with the interval between each motion being determined by the placement of gears 418a and 418b. Thus, when an input rotary motion is applied to shaft 411, pallet 422 is caused to ride up on the peripheral edge (412c or 412d) of locking cam 412 and engage both the peripheral surface (412c or 412d) and idler spur gear 438. While in this position, idler gear 438 is locked and, by so doing, locks output gear 420. During this interval, it should be noted that driving gear 418 is presenting cutout portions 418c or 418d to spur gear 438, thereby allowing driving gear 418 and locking cam 412 to rotate without causing any motion to be imparted to output gear 420. However, as soon as cam cutout 412b, for example, approaches pallet 422, teeth 418b mesh with idler gear 438 causing pallet 422 to move into cam cutout portion 412b unlocking idler gear 438 and imparting a rotary motion to idler gear 438 which, in turn, imparts a rotary motion to output gear 420. As teeth 418b disengage idler 438 the peripheral edge 412c of locking cam 412 moves pallet 422 back to engage idler gear 438 thereby locking output gear 420 until the next operation. While the output may be derived directly from gear 420, shoulder 420a is provided as an output means. The proper selection of ratios of diameters (420 and 420a) providing a slight step-up function. By utilizing a small driving gear with a large output gear together with an idler cluster gear, the output intermittent motion may be reduced to a small fraction of a degree. If so desired, by utilizing a large driving gear and a small output gear with an appropriate idler cluster gear, the output intermittent motion may be increased to several complete revolutions of the output gear for one revolution of the driving gear.

Figure 5A:
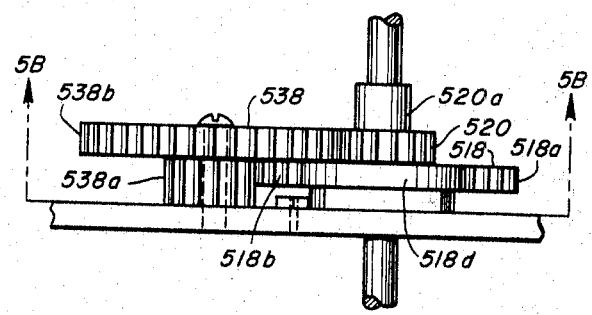
FIGURE 5A is an elevation view of a variation of the embodiment of FIGURE 4A illustrating a single shaft mechanism utilizing step-up gearing.

Referring now to FIGURES 5A and B, there is shown a typical step-up type of arrangement wherein a relatively small motion at the input shaft may be made to produce many degrees or revolutions of output gear. In this embodiment, driving shaft 511 has affixed thereto a locking cam 512 having cam cutout portions 512a and 512b, as previously described with respect to FIGURES 4A, 4B and 4C. It should be noted that the idler gear is now comprised of two sections 538a and 538b which mesh respectively with the teeth 518b of drive gear 518 and with the teeth of output gear 520. In all other respects, the elements in FIGURE 5A and B correspond and function as did similar elements as previously shown and described in FIGURES 4A, 4B and 4C.

Figure 5B:
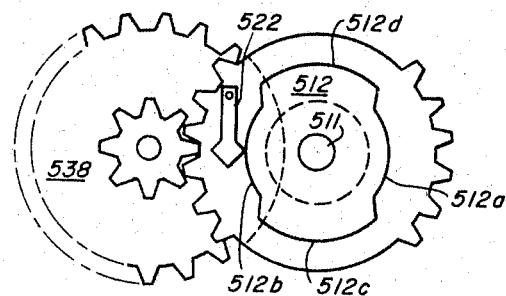
FIGURE 5B is a plan view of the mechanism of FIGURE 5A taken along lines 5B—5B.
Figure 6A:
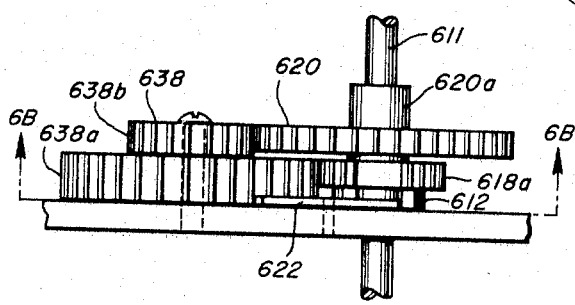
FIGURE 6A is an elevation view of another variation of the embodiment of FIGURE 4A illustrating a single shaft mechanism utilizing step-down gearing.
Figure 6B:
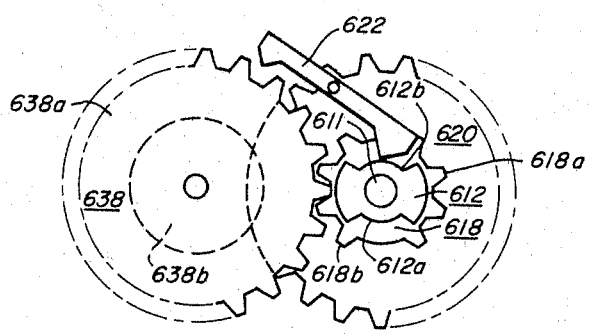
FIGURE 6B is a plan view of the mechanism of FIGURE 6A take along lines 6B—6B.

Referring now to FIGURES 6A and B, there is provided a step-down ratio between the input drive and the output drive. In this embodiment, it should be noted that the output portion 638b of idler 638 is smaller than the input portion 638a and that output gear 620 is larger in diameter than the driving gear 618a. As in the prior embodiments, the input and output are arranged on a common shaft and will operate in both directions, either clockwise or counterclockwise. In this embodiment, it is also shown how the straight rocker pallet may be utilized in place of the spur head pallet of FIGURES 4 and 5. In all other respects, FIGURES 6A and 6B operate in an identical manner as previously described with respect to FIGURES 4A, 4B, and 4C, as well as FIGURES 5A and 5B except for the straight rocker pallet.

What I claim is:
1. An intermittent rotary motion device comprising:
 (A) rotatable cam means including a pair of substantially identical cams,
  (1) each having a bearing portion,
  (2) each having a cutout portion of the peripheral edge thereof, and
  (3) both being disposed on a common axis,
 (B) circular, rotatable toothed driven means,
 (C) drive means
  (1) affixed solely to one of the pair of cams and,
  (2) arranged for periodic engagement with the teeth of the driven means,
 (D) resilient spring means maintaining the pair of cams out of registry with respect to their cutout portions,
 (E) cam follower means having first and second contacting portions, the first said portion being in constant engagement with the cam means,
 (F) the driven means engaged and rotated by the drive means solely when the cutout portions of both cams are in register with each other and the first portion of the cam follower means is in the cutout portions of both cams, and
 (G) driven means locked against any motion when the second portion of the cam follower means is in engagement with the teeth of the driven means and the first portion of the cam follower means is in engagement with a bearing portion of the cam means.

2. An intermittent rotary motion device comprising:
 (A) rotatable cam means having a peripheral edge thereon,
  (1) at least one section of the peripheral edge having a cutout portion, and
  (2) the remainder of the peripheral edge having a bearing portion,
 (B) rotatable, toothed driven means,
 (C) drive means affixed to the cam means for periodic engagement with the teeth of the driven means,
 (D) cam follower means in the form of a circular disc,
  (1) eccentrically mounted with its pivot between the cam means and the driven means,
  (2) in constant engagement with the cam means,
  (3) arranged to swivel into engagement with the teeth of the driven means when the bearing portion engages the disc, and
  (4) arranged to swivel out of engagement with said teeth when the cutout portion is opposite the disc.
 (E) said driven means being engaged and rotated by the drive means solely when the disc is in the cutout portion of the cam means, and
 (F) said driven means being locked against any motion when the disc is in engagement with the teeth of the driven means and with the bearing portion of the cam means.

3. An intermittent rotary motion device comprising:
 (A) rotatable cam means having a peripheral edge thereon,
  (1) at least one section of the peripheral edge having a cutout portion and
  (2) the remainder of the peripheral edge having a bearing portion,
 (B) rotatable, toothed driven means arranged on a common axis with said cam means,
 (C) drive means affixed to the cam means for periodic engagement with the teeth of the driven means,
 (D) an idler between and in engagement with both the drive means and the driven means for at least part of a revolution of the drive means,
 (E) cam follower means having first and second contacting portions, said first portion being in constant engagement with the cam means,
 (F) said driven means being engaged and rotated by the drive means by way of the idler solely when the first portion of the cam follower means is in the cutout portion of the cam means, and
 (G) said idler and driven means being locked against any motion when
  (1) the second portion of the cam follower means is in engagement with the teeth of the idler, and
  (2) the first portion of the cam follower means is in engagement with the bearing portion of the cam means.

4. The device of claim 3, wherein the idler gear comprises:
 first and second gears affixed to each other and arranged on a common axis;
 the diameter of the first gear being larger than the diameter of the second gear to produce a step-up ratio between the drive means and the driven means;
 the first gear in mesh with the drive means, and
 the second gear in mesh with the driven means.

5. The device of claim 3, wherein the idler gear comprises:
  first and second gears affixed to each other and arranged on a common axis,
  the diameter of the first gear being smaller than the diameter of the second gear to produce a step-down ratio between the drive means and the driven means,
  the first gear in mesh with the drive means, and
  the second gear in mesh with the driven means.

References Cited

UNITED STATES PATENTS

| | | | |
|---|---|---|---|
| 2,906,131 | 9/1959 | Daugherty | 74—84 |
| 1,461,579 | 7/1923 | Grimes | 74—435 |
| 3,177,647 | 4/1965 | Meyer | 74—84 X |
| 3,260,128 | 7/1966 | Gassino et al. | 74—84 X |

MILTON KAUFMAN, *Primary Examiner.*

U.S. Cl. X.R.

74—435